Figure 5:
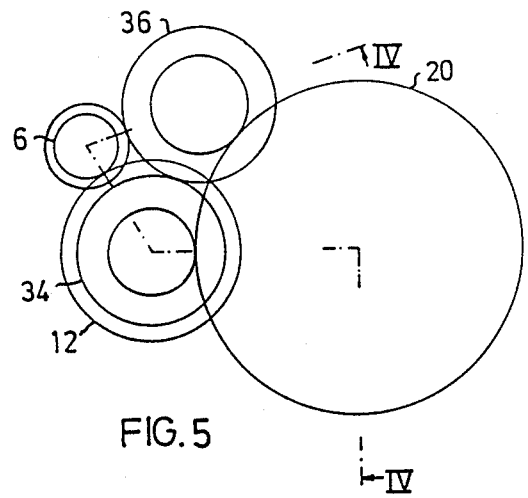

United States Patent [19]

Janiszewski

[11] Patent Number: 4,799,395
[45] Date of Patent: Jan. 24, 1989

[54] MOTOR VEHICLE GEARBOX WITH ONE-WAY CLUTCH IN FIRST GEAR

[75] Inventor: Grzegorz K. Janiszewski, Angered, Sweden

[73] Assignee: AB Volvo, Goteborg, Sweden

[21] Appl. No.: 869,966

[22] Filed: Jun. 2, 1986

[30] Foreign Application Priority Data

Jul. 1, 1985 [SE] Sweden .................. 8503263-9

[51] Int. Cl.⁴ .............................................. F16H 3/10
[52] U.S. Cl. ..................................... 74/331; 192/1.32
[58] Field of Search ................. 74/331, 356, 357, 359; 192/3 H, 1.31, 1.32

[56] References Cited

U.S. PATENT DOCUMENTS

| 1,453,032 | 4/1923 | Von Soden-Fraunhofen | 74/331 |
| 3,589,483 | 6/1971 | Smith | 74/331 X |
| 4,106,358 | 8/1978 | Morrison | 74/359 X |
| 4,116,082 | 9/1978 | Kelbel | 74/359 X |
| 4,377,093 | 3/1983 | Janson | 74/359 X |
| 4,461,188 | 7/1984 | Fisher | 74/331 X |
| 4,565,106 | 1/1986 | Sumiyoshi | 74/359 |
| 4,580,459 | 4/1986 | Zenker et al. | 74/357 X |
| 4,594,908 | 6/1986 | Akashi et al. | 74/359 |

FOREIGN PATENT DOCUMENTS

| 1811091 | 6/1970 | Fed. Rep. of Germany . |
| 2003977 | 8/1971 | Fed. Rep. of Germany . |
| 2011168 | 9/1971 | Fed. Rep. of Germany . |
| 2406253 | 8/1975 | Fed. Rep. of Germany . |
| 2530554 | 1/1984 | France . |
| 22502 | 2/1980 | Japan .................. 192/3 H |
| 58-105827 | 6/1983 | Japan . |
| 433870 | 6/1984 | Sweden . |
| 664671 | 1/1952 | United Kingdom . |
| 1208695 | 10/1970 | United Kingdom . |

Primary Examiner—Leslie A. Braun
Assistant Examiner—Dwight G. Diehl
Attorney, Agent, or Firm—Young & Thompson

[57] ABSTRACT

The invention relates to a motor vehicle gearbox, and is characterized in that a one-way clutch is connected between the releasable gear for the first gear speed and the gearbox housing. The one-way clutch blocks the gear against rotation in the direction for backing the vehicle, thus preventing the vehicle from rolling backwards when starting on an upward incline.

3 Claims, 2 Drawing Sheets

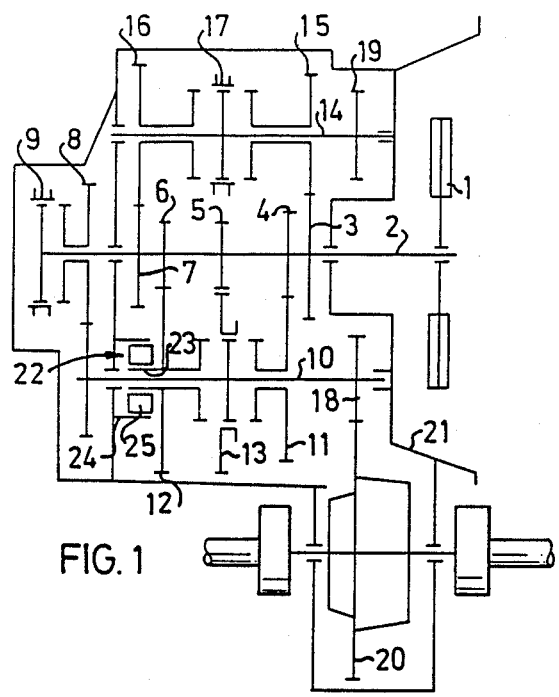
FIG. 1
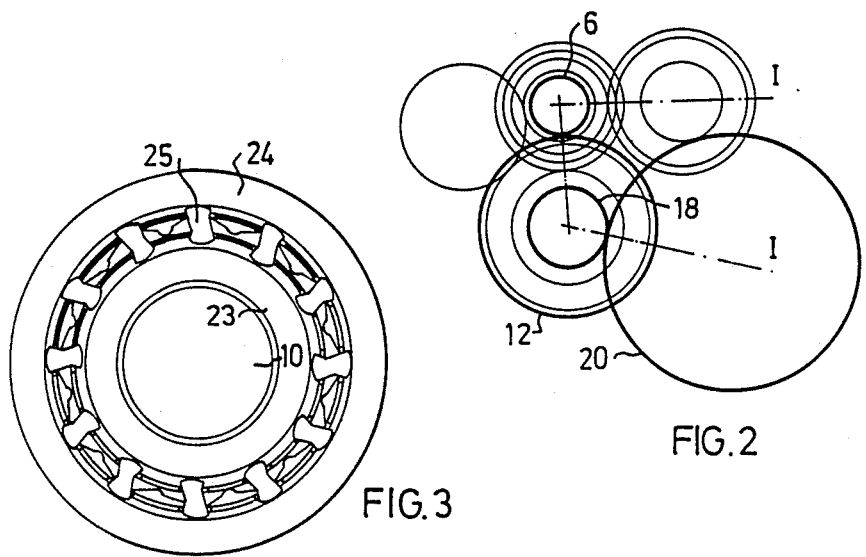
FIG. 3
FIG. 2

MOTOR VEHICLE GEARBOX WITH ONE-WAY CLUTCH IN FIRST GEAR

The present invention relates to a motor vehicle gearbox, comprising a housing with at least one input shaft and at least one intermediate shaft having gears engaging gears on the input shaft, at least one gear in each pair of inter-engaging gears being releasable from its shaft.

A conventional step-geared gearbox with an ordinary disc clutch between the gearbox and the engine cannot be used to prevent the automobile from rolling backwards when starting on an upward incline as can an automatic planetary gearbox a hydrodynamic torque converter disposed between the engine and the gearbox by regulating the engine speed. In vehicles with manual transmissions, the handbrake is therefore normally used when starting on an incline. When doing this, it is important to carefully coordinate the release of the handbrake with depressing the accelerator and letting up of the clutch pedal in order to prevent the vehicle from rolling initially back down the incline. Many drivers consider this to be a very difficult maneuver and therefore choose when starting on an upward incline to "ride" the clutch, i.e. instead of moving one's foot from the accelerator to the brake pedal the throttle is opened slightly over idle speed and the clutch pedal is depressed so that the clutch slips just enough to hold the vehicle stationary. This driving technique results in heavy wear on the clutch discs and when used often results in substantial shortening of the life of the clutch discs.

The purpose of the present invention is to achieve a gearbox of the above mentioned type, which in combination with a conventional disc clutch has the same ability as an automatic transmission with torque converter to prevent the vehicle from rolling backwards when starting on an upward incline, thus eliminating the need to use the handbrake.

This is achieved according to the invention by a one-way clutch being connected between the releasable gear for the lowest forward gear speed and a member solid with the housing, said one-way clutch locking the gear against rotation in the direction for reverse.

The invention provides with simple and inexpensive means a solution which prevents the vehicle from rolling backwards when the lowest gear speed is engaged, and this means that the driver, when he has his foot on the brake pedal and the shift lever in the neutral position, can lift his foot from the brake pedal as soon as the lowest gear speed is engaged without risk of the vehicle rolling backwards.

The invention will be described in more detail with reference to examples shown in the accompanying drawing.

Figure 4:
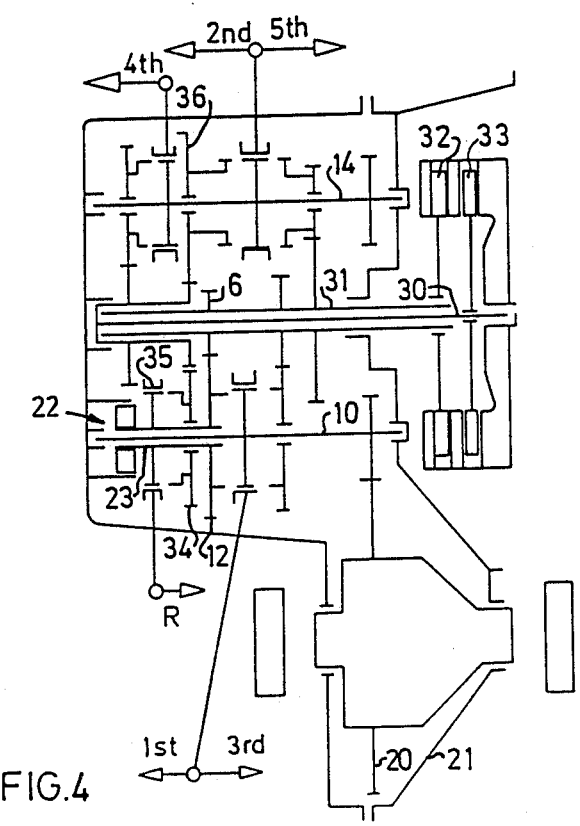

FIGS. 1 and 2 show schematically a five-speed manual gearbox,
FIG. 3 shows an endview of a one-way clutch and
FIGS. 4 and 5 show schematically a five-speed step-geared automatic transmission.

In FIG. 1, 1 designates a disc in a clutch not shown in more detail here. The disc is non-rotatably mounted on an input shaft 2, which also has non-rotatable gears 3, 4, 5, 6 and 7 for fourth, second, reverse, first and third as well as a free gear 8 with synchronizing means and an engaging sleeve 9 for fifth. On a first intermediate shaft 10, free gears 11 and 12 are rotatably journalled and can be locked to the shaft by means of an engaging sleeve 13 with synchronizing means. A second intermediate shaft 14 has rotatably journalled free gears 15 and 16, which can be locked to the shaft by means of an engaging sleeve 17 with synchronizing means. The intermediate shafts 10,14, have non-rotatably mounted gears 18,19, which engage the crown gear in a differential, the housing of which is part of the gearbox housing 21.

According to the invention, a one-way clutch 22 is connected between free gear 12 for the first gear speed and the gearbox housing 21. The one-way clutch 22, which is shown in more detail in FIG. 3, has an inner ring 23 solidly joined to the hub of the free gear 12 and an outer ring 24 securely pressed into an opening in the gearbox housing. Between the inner ring 23 and the outer ring 24 there are laid locking elements 25, which permit rotation of the inner ring 23 relative to the outer ring 24 when torque is transferred from the input shaft to the gear 12, but which blocks rotation when there is torque transfer in the opposite direction from the drive wheels of the vehicle via the crown gear 20 and the gear 18 to the intermediate shaft 10. The one-way clutch 22 thus serves as an automatic aid which "takes over" the function of the handbrake when starting on an upward incline in first gear.

The invention is of course not limited to a gearbox of the above described type. Rather it can also be used in other types of gearboxes, for example in a gearbox of the type shown and described in Swedish Patent Application No. 8501541-0.

Such a gearbox is shown in FIGS. 4 and 5 and in principle differs from the construction described above in that it has two concentrically journalled input shafts 30,31 with individual clutch discs 32,33. In the following, we will only describe details of importance for elucidating the blocking function according to the present invention. For a more complete description of the design of the gearbox in question the reader is referred to the above mentioned patent application.

A reversing gear 34 is freely rotatably journalled on the hub 23 of the free gear 12 for the first gear speed. By means of an axially displaceable engaging sleeve 35, the reversing gear 34 can be locked to the hub 23. The gear 34 engages the free gear 36 for the second gear speed on the intermediate shaft 14. As in the embodiment described above, there is coupled between the hub 23 and the gearbox housing a one-way clutch 22, which assumes the function of the handbrake when starting on an upward incline in first gear by blocking against rotation of the intermediate shaft 10 in a direction opposite to the rotational direction for driving forward.

In the gearbox shown in FIGS. 4 and 5, the additional advantage is achieved, however, that the one-way clutch also blocks against forward movement when reverse is engaged, and this facilitates starting backwards on an incline in a corresponding manner. This function is obtained by virtue of the fact that the gear 12 for first has the same rotational direction when backing as it does for driving forward, since the reversing function is obtained by reversing the rotational direction of the intermediate shaft 14 when torque is transmitted via the reversing gear 34 and the free gear 36 for second.

I claim:
1. Motor vehicle gearbox, comprising a housing with at least one input shaft and at least one intermediate shaft having gears engaging gears on the input shaft, at least one gear in each pair of interengaging gears being releasable/from its shaft, characterized in that a one-way clutch is connected between only the releasable gear for a lowest forward gear speed and a member solid with the housing, said one-way clutch blocking the releasable gear for the lowest forward gear speed against rotation in a direction opposite the rotational direction for driving forward, said releasable gear for the lowest forward gear speed having a speed of rotation lower than that of said input shaft.

2. Gearbox according to claim 1, with two intermediate shafts and two concentrically journalled input shafts, arranged to be driven alternately and disposed in a plane separate from the plane of the intermediate shafts, characterized in that said releasable gear for the lowest gear speed is journalled on one intermediate shaft and is lockable relative to a freely rotatably journalled, reversing gear which engages a gear on the other intermediate shaft for driving said other intermediate shaft in a direction opposite to the rotational direction for driving forward, whereby the one-way clutch blocks the second intermediate shaft against rotation in a direction for driving forward when the reversing gear is locked relative to said releasable gear for the lowest gear speed.

3. Gearbox according to claim 1, characterized that the one-way clutch has an outer ring fixed to a wall of the housing, an inner ring fixed to the hub of the releasable gear for the lowest gear speed for driving forward, and blocking elements arranged between the rings, for permitting rotation of the inner ring only in the direction for driving forward.

* * * * *